Dec. 14, 1971     D. E. WALDECKER     3,626,766
PORTABLE SPEEDOMETER
Filed July 20, 1970
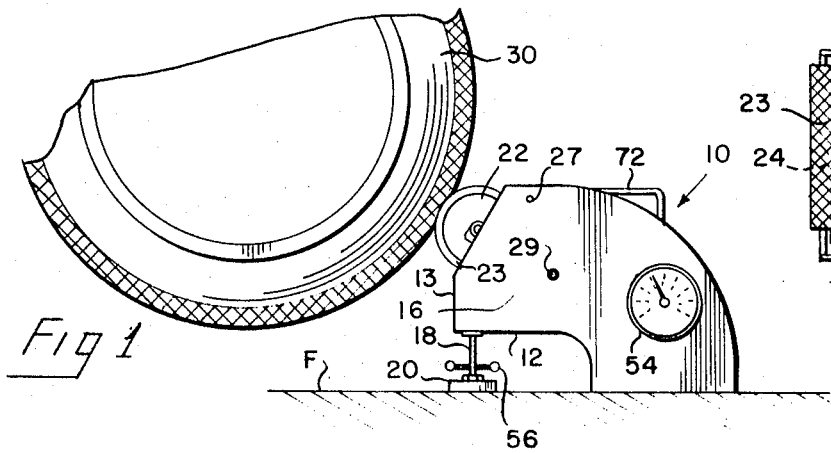
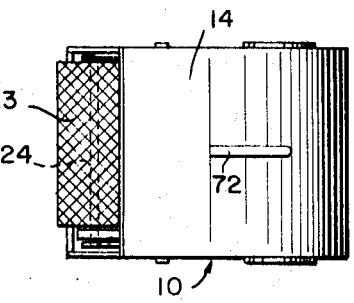
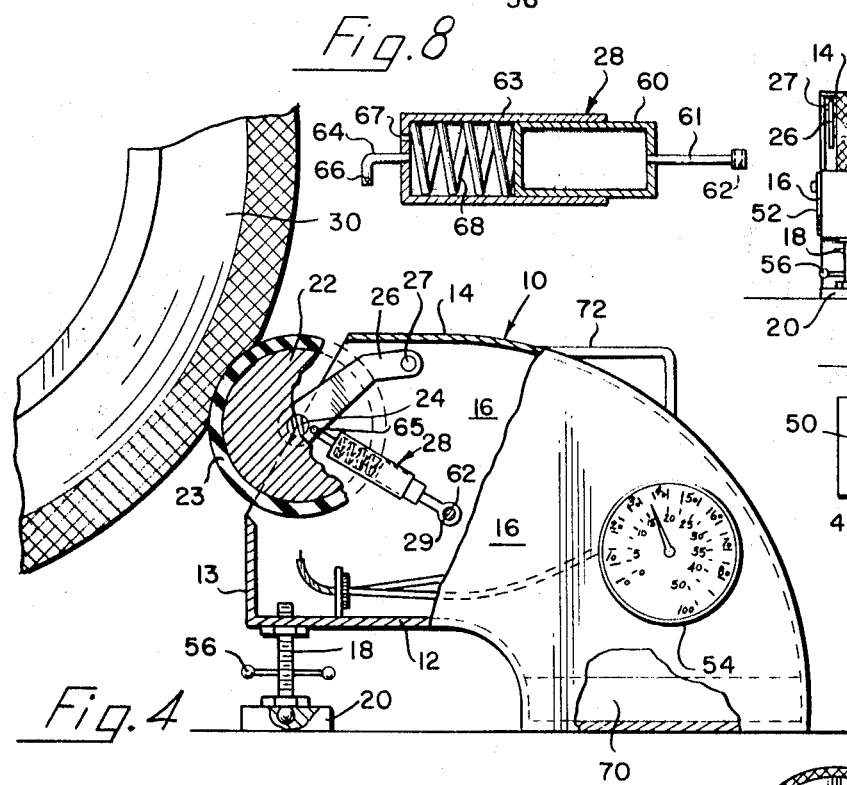
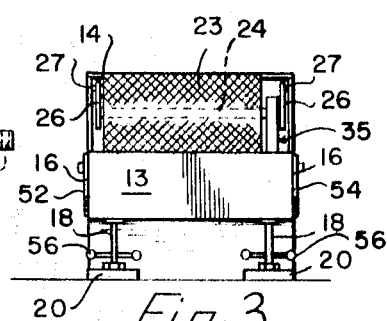
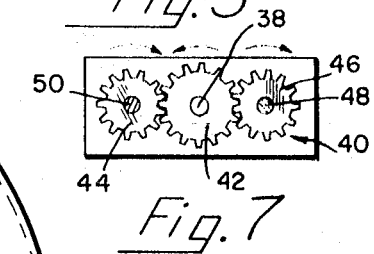
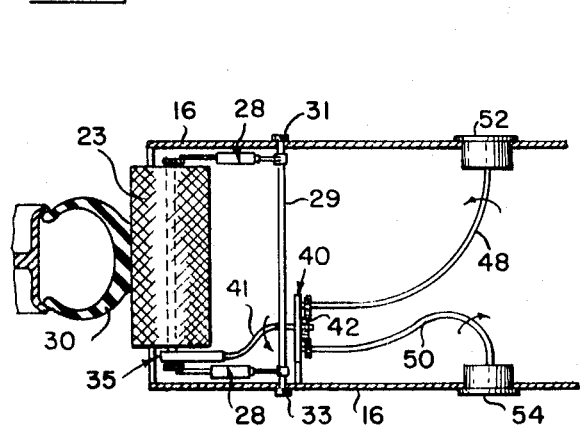
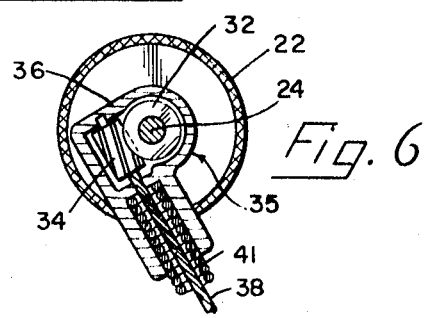
INVENTOR.
DONALD E. WALDECKER
BY
Glenn E. Wise
AGENT

United States Patent Office 3,626,766
Patented Dec. 14, 1971

3,626,766
PORTABLE SPEEDOMETER
Donald E. Waldecker, Fairfax, Va., assignor to RAM Enterprises, Incorporated, Falls Church, Va.
Filed July 20, 1970, Ser. No. 56,382
Int. Cl. F16h 37/04; G01c 25/00
U.S. Cl. 74—12                                    10 Claims

ABSTRACT OF THE DISCLOSURE

A portable device for testing speedometers on automobiles, trucks and other similar land vehicles, and for indicating wheel speed during wheel balancing and other automotive maintenance operations. The device includes means for providing direct speed readings for vehicles equipped with either conventional or "limited-slip" differentials.

---

This invention relates to a portable speedometer, and, more particularly, to a speedometer which is adapted to be actuated by the rotation of a tire of a motor vehicle.

One object of the invention is to provide a portable device for testing speedometers on various types of wheeled land vehicles.

Another object of the invention is to provide a portable speedometer that can be utilized, along with various types of dynamic wheel balancing equipment, to indicate speed or rate of wheel or tire rotation during wheel balancing or other maintenance operations.

Another object of the invention is to provide a device which is capable of communicating to a mechanic, or other user, the speed or rate of tire or wheel rotation on indicators visible from plural positions and capable of providing alternative readings resulting from either conventional or "limited slip" differential wheel drives.

Still another object of the invention is the provision of supporting structure adapted to adjust the device to a desired use position.

A further object of the invention is to provide a device useful in determining the approximate engine and/or wheel speeds at which various undesirable rattles and/or vibrations occur in a particular automotive vehicle, and thus assist in locating the source of such rattles and/or vibrations.

Still another object of the invention is to provide a portable speedometer which is adapted to be driven by frictional contact of a portion thereof with the circumference of a rotating vehicular tire. Shock-absorbing and biasing means are included in my speedometer construction to prevent any substantial slippage between a rotating wheel-mounted vehicle tire and a driven rotatable drum which is the drive input portion of my speedometer.

Other objects of the invention will become apparent from the remainder of this specification, and from the drawings which accompany this specification and form a part of this application.

In the drawings:

FIG. 1 is a side view of my speedometer device shown in its use position with a wheel-mounted automobile-carried tire bearing thereagainst;

FIG. 2 is a plan view of the device;

FIG. 3 is a front elevation view of the device;

FIG. 4 is an enlarged partial sectional view of the device;

FIG. 5 is an illustration of some of the operating mechanism of my device, including a drive drum, drive cables, gears and indicating instruments;

FIG. 6 is a view, partly in section of a gearing means driven by the shaft of my drive drum;

FIG. 7 is an illustration of gearing for translating a singular drive input into plural outputs with both outputs rotating in the same direction; and, FIG. 8 is a detailed view, partly in section, of one of two identical shock-absorbers utilized in my device.

In the illustrated device, developed primarily for testing vehicle-installed speedometers and for use in determining wheel balancing speeds, the numeral 10 designates, generally, a housing. Housing 10 comprises a base 12, a front wall 13, and a top wall 14 all of which are attached to opposed walls 16. As best shown in FIG. 4, the base 12 is supported directly on the floor F of a garage, or the like, at one end, and by adjustable screw jacks 18 and feet 20 at the other end.

As further shown in FIG. 4, a rotatable drum 22 which has a friction-increasing layer 23 of roughened rubber or the like, bonded to the periphery thereof, also has a shaft 24 rigidly attached thereto and extending from opposite ends thereof. The ends of shaft 24 are adapted to be rotatably mounted in suitable bearings (not shown) carried in one end of each of arms 26. Arms 26, at their other ends each have rigidly attached thereto and extending horizontally therefrom aligned pivot studs 27 which are respectively journaled in bearing means (not shown) in opposite walls 16. Spring-expanded, air-type shock-absorbers, shown generally at 28, are operatively mounted within the housing 10 to urge drum 22 outwardly against a rotating automobile tire 30. Each shock absorber 28 has one end attached to an arm 26 and its other end attached to a shaft 29. Shaft 29 is journaled for rotation in bearing means (not shown) in the opposite side walls 16, 16, and is prevented from moving axially by a pair of collars 31, 33 affixed (by means not shown) on opposite ends thereof.

Shock-absorbers 28, as will best be understood by reference to FIG. 8, each comprise a piston 60 to one end of which is fastened a first connecting element 61. In the other end of each element 61 is a bore 62. Shaft 29, it will be noted from an inspection of FIGS. 4 and 5, passes through each bore 62, and is welded, or otherwise fastened, to elements 61.

Shock-absorbers 28 also each include a cylinder member 63 to one end of each of which is fastened an L-shaped second connecting element 64. The other end of each of elements 64 is located in an aperture 65 in each of arms 26 (see FIG. 4), and is fastened thereto by means of a cotter pin (not shown) located in an aperture 66 in each of elements 64. In the end wall of each of cylinders 63 is located an air bleed port 67, and between the end of each piston 60 and its respective cylinder 63 is located a compression spring 68 which normally tends to bias each cylinder away from its respective piston.

It should now be apparent that when my device is positioned in such manner that the periphery of layer 23 is in firm engagement with the periphery of a vehicle-mounted rotatable tire 30, it is maintained in its operative position, against the tire, not only due to the overall weight of my device, but also by the compression springs 68 which continually act to urge layer 23 against tire 30, as seen in FIG. 4. Thus, the shock-absorbers 28 resist movement of the layer 23 away from the tire 30, but will permit such movement if a force is exerted by the tire against layer 23 of sufficient magnitude to collapse the shock-absorbers 28 by overcoming the springs 68; moving cylinders 63 toward pistons 60; and exhausting air, compressed by such movement of the cylinders and pistons, out of ports 67. Of course, as soon as a force sufficient to collapse the shock-absorbers, as just described, diminishes springs 68 will again expand the shock-absorbers 28 and thereby move layer 23 to the left and up, as seen in FIG. 4, as arms 26 pivot about the axes of their respective studs 27.

Near one end of shaft 24 is located a gear assembly, designated generally as 35. Shaft 24 has a gear 32 keyed or otherwise secured thereto as best seen in FIG. 6, and is adapted to drive gear 34, mounted on the end of a flexible shaft 38 to which it is welded, or otherwise affixed. The end of shaft 38, to which gear 34 is affixed, is journaled for rotation, it will be noted in FIG. 6, in a gear box 36.

FIG. 5 shows shaft 38 extending to another gear assembly, designated generally at 40. Rotation of shaft 24 causes rotation of shaft 38 at the desired rate. Shaft 38 is housed within a flexible helically wound sheath 41 which extends between gear assemblies 35 and 40.

Gear assembly 40, as shown somewhat schematically in FIGS. 5 and 7, contains three gears in meshing relationship. Shaft 38 is rigidly connected to gear 42. Plural flexible output shafts 48 and 50 are rigidly connected, respectively, to gears 46 and 44. As can be seen in FIG. 7, flexible output shafts 48 and 50 will be caused to rotate in the same direction. These output shafts 48 and 50 are rigidly connected, respectively, to the indicating pointers of speed indicators 52 and 54. By this arrangement both pointers indicate an increase in speed by rotating clockwise when individually viewed from either side of my device. This is beneficial to a mechanic who may be on either side of my device during his use thereof.

As shown in FIG. 4, jack screws 18 are threadedly received in base 12 of the housing 10 and mounted in feet 20. Handles 56 may be used for manual adjustment of the screw so that layer 23 of drum 22 is raised to the desired position. The housing 10, though portable, is relatively heavy so that it will stay in position against a rotating automobile tire. A non-skid surface may be placed on the bottom of the housing 10 and feet 20 for contact with the floor. If desired, small retractable casters may be placed on the bottom of housing 10 for ease of movement thereof. The housing 10 is provided with means such as a concrete or lead mass 70 for added weight, and also with a handle 72 to aid in manipulation of my device to and from its point of use.

The faces of speed indicators 52, 54 are marked in two scales, each from zero upwardly to any maximums desired. The two scale indicators are used to provide readings of use when checking the speeds delivered by different types of differential gearing. When the disclosed device is used in checking the speed of an automobile tire driven by a "limited slip" differential, it is necessary to jack up both driven, usually rear wheels. The true speed will then be indicated on the outermost of the two concentric scales on indicators 52, 54. When the device is used in checking the speed of a conventional differential, it is necessary to jack up one of the two driven wheels. The corrected true speed will then be indicated on the innermost of the two scales, since the tire will be driven at twice normal rate by the vehicle's power train. Such true speeds are important to a mechanic, not only when testing a vehicle's installed speedometer for accuracy, but also during dynamic tire balancing operations, and other vibrations or rattle locating checks.

As previously described, the shock absorbers 28 hold the friction layer 23 of drum 22 against the tire, and this results in a proper reading on the appropriate scale on both speed indicators 52 and 54.

When a non-driven tire, usually a front tire, is being checked for speed when balancing, or during other maintenance procedures such as rattle location determination, the operation of the disclosed device is substantially as follows. The non-driven wheel is raised up from the surface F and driven at a desired rate by a conventional motorized wheel spinning device (not shown) and the balancing or other procedure is performed.

Wheel balancing as well as speedometer calibration checks may soon be required under State safety inspection laws. This device by its novel arrangement is presently useful for the purposes described herein, and would, due to its capabilities, as described, be very useful in assisting mechanics and motorists in complying with such legal requirements, if enacted.

Having now set forth my invention, what I desire to secure by Letters Patent is as follows:

What is claimed is:

1. A testing device for use in conjunction with a turning wheel-mounted tire of a vehicle for indicating the speed thereof comprising:
   a housing having opposite sides;
   speed indicating means located on at least one side of said housing;
   a drum, the periphery of which is adapted to contact and be rotatably driven by said tire for transmitting the speed of said tire to said indicating means;
   means for supporting said drum for rotation about its axis;
   additional means for supporting said drum for movement in addition to said rotational movement, relative to said housing;
   spring means for urging said drum in one direction;
   fluid brake means for resisting sudden movement of said drum in another direction; and,
   means for transmitting the rotational motion of said drum to said speed indicating means.

2. The subject matter of claim 1, said transmitting means including gear means associated with and adapted to be driven by said drum, and motion transmission means having an input from said gear means and having output means adapted to drive said speed indicating means.

3. The subject matter of claim 1 wherein said speed indicating means contains plural scales, whereby said device is adaptable for use with vehicles having either conventional or limited slip differentials.

4. The subject matter of claim 1 wherein said housing includes means for adjusting the height thereof for positioning said drum relative to a vehicle tire.

5. The subject matter of claim 1, said transmitting means including:
   first gear means associated with said drum so as to be rotatable therewith; and,
   second gear means having an input from said first gear means and having plural output means each connected with indicating means on opposite sides of said housing,
   said plural outputs from said second gear means being arranged so that identical indications are presented by said indicating means.

6. The subject matter of claim 5 wherein two oppositely oriented indicating means are provided, each said indicating means including pointer and scale means readable alternatively by an operator facing the external portion of one or the other sides of said housing.

7. The combination of claim 1, said spring means and said fluid brake means comprising at least one spring-including fluid-type shock-absorber.

8. A testing device for use in conjunction with a turning wheel-mounted tire of a vehicle for indicating the speed thereof comprising:
   a support having opposite sides;
   two oppositely oriented speed indicating means mounted on said support;
   only one of said indicating means being readable by an observer facing one of said sides, and only the other of said indicating means being readable by an observer facing the other of said sides;
   a drum, the periphery of which is adapted to contact and be rotatably driven by said tire for transmitting the speed of said tire to said indicating means;
   means on said support mounting said drum for rotation about its axis; and,
   means for transmitting the rotational motion of said drum to said speed indicating means.

9. The subject matter of claim 8, wherein said speed indicating means each contain plural scales whereby said device may be used with vehicles having either conventional or limited slip differentials.

10. The subject matter of claim 8, said transmitting means including:
- first gear means associated with said drum so as to be rotatable therewith; and,
- second gear means having an input from said first gear means and having plural outputs, one output connected to each of said indicating means, said plural outputs being arranged so that substantially identical speed indications are presented by both of said indicating means.

References Cited

UNITED STATES PATENTS

| | | | |
|---|---|---|---|
| 1,634,565 | 7/1927 | Wallbillich | 74—12 |
| 2,781,659 | 2/1959 | Parker, Jr. | 73—2 |
| 3,527,090 | 9/1970 | Imada | 73—117 UX |

FOREIGN PATENTS

| | | | |
|---|---|---|---|
| 1,482,423 | 4/1967 | France | 73—117 |

LEONARD H. GERIN, Primary Examiner

U.S. Cl. X.R.

73—2